United States Patent

Schmitt

[15] 3,681,605

[45] Aug. 1, 1972

[54] PHOTOELECTRIC DEVICE FOR THE DETERMINATION OF THE POSITION OF LINE MARKINGS

[72] Inventor: Walter Schmitt, Egerer, Germany

[73] Assignee: Firma Dr. Johannes Heidenhain, Traunreut b. Traunstein, Germany

[22] Filed: Aug. 4, 1970

[21] Appl. No.: 60,842

[30] Foreign Application Priority Data

Aug. 6, 1969 Germany............P 19 39 901.0

[52] U.S. Cl. ..................250/206, 250/232, 356/167
[51] Int. Cl.......G01d 5/36, G01b 11/00, H01j 39/12
[58] Field of Search..............250/206, 232; 356/167

[56] References Cited

UNITED STATES PATENTS 3,454,776  7/1969  Hock............................250/232
3,502,415  3/1970  Hock........................250/232 X

*Primary Examiner*—James W. Lawrence
*Assistant Examiner*—T. N. Grigsby
*Attorney*—Ernest G. Montague

[57] ABSTRACT

A photo-electric device for the determination of the position of line markings with a swinging element in a way path, through which a light stream impinging upon a photo-electronic element is periodically varied, which comprises a swinging element and a switch controlled by the movement of the swinging element. A photo-electronic element emits and electric output signal. Two channels are provided and the switch connects alternately the electric output signal with one of the channels. The switching takes place at about the turning point of the swinging element, so that the reciprocation of the swinging element causes a series of impulses in the two separate channels. Means are provided for the determination of the relative phase position of two harmonic oscillations of equal frequency, contained in each of said series of said impulses.

4 Claims, 1 Drawing Figure

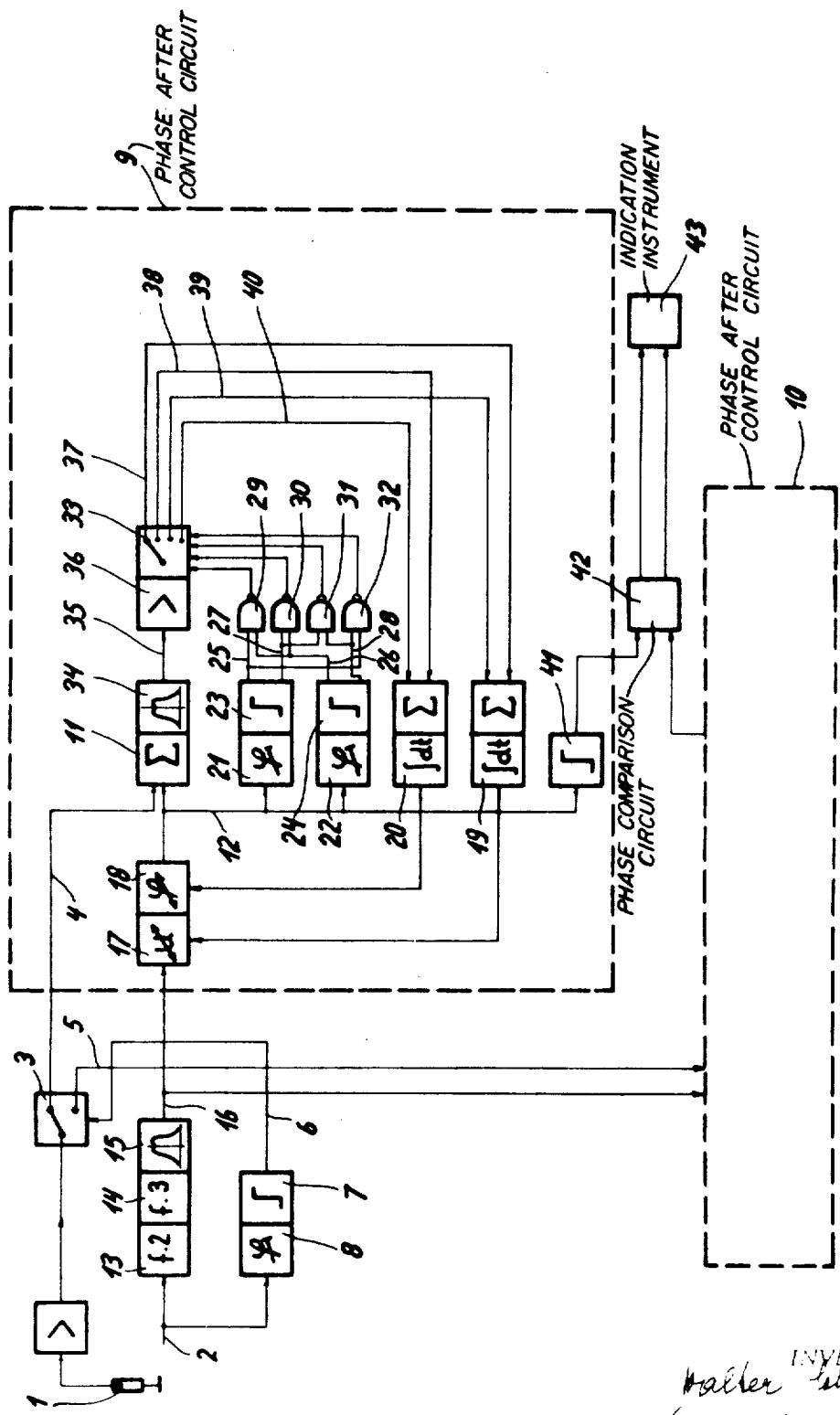

PHOTOELECTRIC DEVICE FOR THE DETERMINATION OF THE POSITION OF LINE MARKINGS

The present invention relates to a photo electric device for the determination of the position of line markings with a swinging element in the path of the rays, through which the light beam impinging upon a photo-electric member varies periodically. The swinging element can be, for instance, a swinging mirror, a swinging plate with parallel faces, a swinging screen or a swinging wire. The swinging element is excited by an electric alternating voltage in any known manner for a swinging operation. In case of a tensioned wire, as a swinging element, this can be performed in known manner such, that the wire is tensioned in a magnetic field and is passed by the exciting alternating current.

The image of the line marking is disposed in the swinging plane of the tensioned wire. In case of swinging mirrors or plates with parallel faces, a particular screen is required in the ray-path, on which the line marking is imaged. In each case the movement of the swinging element causes at the same moment a variation of the light current, by moving the image of the line marking over the screen or the screen over the image of the line marking. Since the swinging element performs a periodic movement, also a periodic light current variation will take place, which expresses itself again in a periodic variation of the signal emitted from the photo-electronic member. Generally, thus, a series of electrical impulses is created.

The determination of the position of the line marking relative to the scanning device takes place in known devices of this type either such, that a comparison of the times takes place, which are disposed between the brushing-over of the line marking by the screen in the forward-and return-run and, on the other hand, between the brushing-over in the return-and forward-run. A device has become known also, however, in which the series of impulses emitted from the photo-electronic element an unstraight harmonic is sieved out and in which the phase position of this harmonic is compared with the phase position of the corresponding harmonic, which is derived from the excitement-frequency for the swinging element.

The known devices of the first mentioned type have the drawback, but, in case of non-symmetrically formed line markings, measuring errors are created. Furthermore, a further measuring non-safety is created such, that only a few discrete time points of the total signal period did contribute to the measuring, because the signal is triggered in these known devices at a predetermined signal height. Due to the noise of the signal, a certain un-safety results for the time point of triggering. The second mentioned known device has the drawback, that it is suitable only as a zero-instrument and has only at all in the neighborhood of the zero-evener a sufficient sensitivity. By this arrangement thus only settings can be obtained, in which the position of the line marking does not deviate from the zero position. For other positions of the line marking, a particular measuring system must be provided, which displaces the line marking or its image so far, that the photo-electric scanning device can operate as a zero-instrument. Instead the displacement of the line marking, in the last mentioned device, as a matter of course, also the scanning screeen can be displaced measurably. This brings about, however, the same drawbacks, namely the requirement of a very exact measuring device.

On the other hand, it can appear desirable, that the photo electric scanning device permits, with the same exactness and sensitivity, with which a setting to zero can take place, to measure also variations and to set the same, without requiring therefor an additional measuring system.

It is one object of the present invention to provide a photo-electric device for the determination of the position of line markings, wherein the drawbacks of the known devices are avoided and to create a photo-electric device of the type set forth above, which cannot only operate exactly extensively independent from the formation of the line markings, which, however, is also suitable as measuring system for linear displacements of the line markings within a predetermined range.

It is another object of the present invention, to provide a photo-electric device for the determination of the position of line markings, wherein the object is obtained in the first place by a switch controlled by the movement of the swinging element, which switch connects the electrical output signal delivered from the photo-electronic member, alternately with one of two channels, whereby the switching takes place about in the reversal time point of the swinging element, so that the forward-and return-run of the swinging element cause an impulse series each in the two separate channels, and which is furthermore characterized by means for the determination of the relative phase position of two harmonic oscillations of the same frequency, which are contained each in one of the two impulse series. The switching over must not effect necessarily the electronic output signal of the photo-electronic member, rather it can already take place prior to the transformation of the light current into an electric signal purely optically, by example, by optical polarization.

The mentioned device permits also, by selection of a harmonic corresponding to the high order number to increase selectively the sensitivity and exactness, however, by taking in stride of a certain multi-interpretation within the path covered by the swinging element. In accordance with the present invention, however, also a high exactness as well as a single meaning of the indication can be obtained such, that the arrangement in accordance with the present invention is applied for a higher harmonic, as well as for a lower harmonic simultaneously. The higher harmonic delivers thereby the high exactness, and the lower harmonic secures the single meaning of the indication.

Suitably, means are provided for the production of a harmonic oscillation from the excitement-frequency of the swinging element and phase displacement for these harmonic oscillations, which automatically bring about the harmonic swinging derived from the exciting frequency into a rigid phase relation to the harmonic oscillations of equal frequency, contained in both impulse series. Contrary to the known device, in which likewise harmonic upper waves are used for the measuring, in the case of the present invention, however, the comparison of a harmonic from the photo-electric signal with the corresponding harmonic from the excitement-frequency does not constitute the measuring result, rather such phase-corrected upper wave is produced in each of the two channels and these two harmonics are compared with each other concerning the phase position.

The comparison of the phase positions and of the amplitudes of the harmonic from the impulse series and corresponding harmonic from the excitement-frequency takes place suitably such, that the period duration of the harmonic from the excitement-frequency is divided into four successive time sections, while their first and third feeds the filtered overlying signal of the harmonic from the excitement-frequency and the harmonic of the impulse series to a first integral member and while their second and fourth is stretched to a second integral member and that at the output of the one integral member the phase position and the output of the other controls the amplitude of the harmonic derived from the excitement-frequency. The control of the amplitude makes possible thereby a complete and exact evening of the phase.

Thereby, the switch feeding the overlying signal to the integral members can be provided, the switchings of which is controlled by four logic connection elements, which in turn form the possible combinations of two rectangular voltages and their inverts, whereby the rectangular voltages are produced from the harmonic derived from the exciting frequency by means of pre-settable phase displacers and by means of triggers in such manner, that they have a scanning ratio of 1:1 and a relative phase position of about 90°.

With these and other objects in view which will become apparent in the following detailed description, the present invention will be clearly understood, in connection with the accompanying drawing, in which the only FIGURE discloses a schematic embodiment by example of the present invention, whereby the parts of the device are omitted, which concern the swinging element, the ray-path and the line marking.

These devices are known per se and require no further explanation. These known devices are in operative connection with the device disclosed in the drawing, so that the light current varied periodically by the movement of the swinging element is impinged upon the photo-electronic member 1. Furthermore the excitement voltage for the swinging element is available at the conduit 2. The electrical signal emitted from the photo-electronic element 1 is amplified and arrives by means of a switch 3 alternately at the channels 4 and 5. The time sections, during which the signal is switched to the channels 4 and 5, respectively, determine in accordance with the timely arrangement a rectangular signal 6, which is derived directly from the excitement-frequency 2 by triggering by means of an impulse former step 7. A settable phase displacement 8 serves the purpose, to arrange the switching time points of the switch 3 such, that they coincide timely with the return time points of the swinging element. Thus in the conduit 4, as well as in the conduit 5, an impulse series each is created. The impulses coincide timely with the time points, in which by the movement of the swinging element a screen brushes over the image of the line marking. The impulse series 4 should, by example, produce all over coverings in case of movement in forward direction, the impulse series 5, however, all over coverings during the return movement of the swinging element. The two impulse series are formed, in known manner, in accordance with the formation of the line markings triangularly shaped. In case of an asymmetric formation of the line marking, for instance, an impulse can assume also the form a triangle having non-equal arms.

The position of the line marking is now determined in such manner, that the relative phase position of two harmonic oscillations of equal frequency is determined, which frequency is contained in the impulse series 4 and 5. For this purpose, a switch each is provided in each of the two channels 4 and 5, of which however for drawing reasons only the switch 9 for the channel 4 is clearly shown, while the switch 10 for the channel 5 is formed in the same manner.

The impulse series 4 is additively super-imposed with a signal 12 by means of an additional amplifier 11, which signal 12 is produced in the following manner: Form the excitement-frequency 2 for the swinging element the sixth upper wave is produced by the frequency multiplier 13 and 14. This 6th upper wave can be separated by means of a filter 15 from upper waves of another order number. At the output 16 is disposed in the chosen example thus exclusively the sixth upper wave of the excitement-frequency 2. This harmonic of the excitement-frequency 2 is fed to automatically operating setting numbers 17 for the amplitude and 18 for the phase position. The setting members 17 and 18 are controlled by the output of an integral member 19 and 20 each. Thus it depends from the output of the integral member 19, whether a control of the amplitude, and from the integral member 20, whether a control of the phase of the signal 12 takes place. This control occurs such, that a predetermined phase relation between the harmonic contained in the signal 4 and the harmonic 12 derived from the excitement-frequency 2 and after controlled by the setting members 17 and 18.

The determination, that a predetermined amplitude ratio and a predetermined phase position exists, takes place in the following manner: The harmonic oscillation 12 is fed through a settable face slide 21 and 22, respectively. Thereafter, follow an impulse former step 23 and 24, each so that at the outputs 25, 26, 27 and 28, two rectangular impulse successions with a scanning ratio and a relative phase position of about 90°, caused by the rigid setting of the phase slides 21 and 22, are present. By logical combination elements 29, 30, 31 and 32, which can, for instance, be Nand elements, the combinations are formed from the signals 25, 26 and their inverts. Accordingly at the output of the connection members 29, 30, 31 and 32 output signals occur in timely succession, and in particular such, that at each time point an output signal occurs only one of these conduits and the durations are of equal length in pairs for the outputs 29 and 31, and 30 and 32, respectively. A switch 33 is controlled by these outputs, which switch 33 switches the signal 35 delivered from the summary amplifier 11 and freed by a band filter 34 from all harmonics, with the exception of the sixth harmonic after amplification by means of an amplifier 36 to one of the conduits 37, 38, 39 and 40 each. The signal 35 should thereby be switched to the conduit 37 during the time period, in which time period an impulse is present in the output of the connection element 29, correspondingly to the conduits 38, 29, 40, if impulses are present at the output of the connection members 30, 31, and 32. The harmonic 35 is divided in this manner into four sections, of which those passing the conduits 37 and 39 are disposed in a counterphase, as also the sections passing the conduits 38 and 30. Two sections each disposed in a counterphase to each other are joined and fed to the already mentioned integral members 19 and 20. The latter guide, is disclosed above, a fixed phase relation between the harmonic 12 derived from the excitement-frequency 2 and the harmonic, which is contained in the impulse series 4.

The accommodation takes place without influence of any errors of the filter 34. The harmonic 12 is now applied to the comparison with the correspondingly formed harmonic from the switch 10. For this purpose the harmonic 12 is triggered in an impulse former step 41 and fed to a phase comparison circuit 42. The corresponding signal of the switch 10 is likewise fed to the phase comparison circuit 42. An indication instrument 43 indicates, in which relative phase position are arranged the two input signals of the phase comparison circuit 42. This phase position constitutes a measure for the line position. The indication is, aside from the previously mentioned non-sensitivity, relative to the phase distortions, by the filter 34 and the filter corresponding therewith in the circuit 10, non-sensitive relative phase distortions by the filter 15.

While I have disclosed one embodiment of the present invention, it is to be understood that this embodiment is given by example only and not in a limiting sense.

I claim:

1. A photo-electric device for the determination of the position of line markings adapted to be used with a swinging element in a path through which a light stream impinging upon a photo-electronic element is periodically varied, comprising
    a switch adapted to be controlled by the movement of said swinging element,
    a photo-electronic element means emitting an electric output signal and adapted to be dependent on the light variation caused by said swinging element and an image of a line marking in the swinging plane of the swinging element,
    two separate channels,
    said switch connecting alternately said electric output signal with one of said channels,
    means for causing the connecting alternately of said electric output signal with one of said channels to take place at about the back and fourth swinging turning point of said swinging element, so that the reciprocation of said swinging element causes a series of impulses in said two separate channels,
    means for the determination of the relative phase position of two harmonic oscillations of equal frequency, contained in each of said series of said impulses including means for production of harmonic oscillations from an excitement frequency of said swinging element, and
    a phase slide means each for said harmonic oscillation for bringing about said harmonic oscillation produced from the excitement frequency into a fixed phase relation relative to harmonic oscillations of equal frequency contained in both of said series of impulses.

2. The device as set forth in claim 1 including means for dividing the period duration of said harmonics from the excitement frequency into four successive time section for the comparison of the phase positions and of the amplitudes of the harmonic from the series of impulses and the corresponding harmonics from the excitement frequency,
    means for superimposing and filtering a signal of the harmonics from the excitement frequency and the harmonics of the series of impulses,
    a first integrating member connected to receive the filtered superposed signal of the harmonics from the excitement frequency and the harmonics of the series of impulses fed by a first and a third of said time sections,
    a second integrating member connected to receive said filtered superposed signal fed by a second and a fourth of said time sections, and
    a first operating setting means controlled by the output of said first integrating member for controlling the phase of the harmonics from the excitement frequency, and
    a second operating setting means controlled by the output of said second integrating member and for controlling the amplitude of the harmonic derived from the excitement frequency.

3. The device, as set forth in claim 2, which includes
    a second switch connected to and feeding said filtered superposed signal to said integrating members,
    four logic connection means for controlling the switching of said second switch,
    two impulse former triggers connected to the output of said phase slides, respectively, and for each producing one rectangular voltage signal and invert thereof from said harmonics derived from the excitement frequency such that they have a scanning ratio of 1:1 and a relative phase position of about 90° and
    conduit means for feeding all the possible different combinations of said rectangular voltage and inverts thereof, one from each of said impulse former triggers to each of said four logic connection means for controlling the latter.

4. The device, as set forth in claim 2, including
    a phase comparison means for comparing said harmonic from one channel which is controlled in relation to its phase position by the excitement frequency with the corresponding controlled harmonic from the other channel for the formation of a measuring value for the position of the line markings.

* * * * *